United States Patent [19]

Kucera

[11] 4,316,691
[45] Feb. 23, 1982

[54] ROUND BALE HANDLING ATTACHMENT FOR A TRACTOR

[75] Inventor: Joseph B. Kucera, Traer, Iowa

[73] Assignee: Rudolph L. Lowell, Des Moines, Iowa ; a part interest

[21] Appl. No.: 133,472

[22] Filed: Mar. 24, 1980

[51] Int. Cl.³ .......................... A01D 87/12; B66F 9/19
[52] U.S. Cl. .................. 414/24.5; 414/703; 414/704; 414/785
[58] Field of Search ................ 414/24.5, 24.6, 497, 414/684, 703, 704, 725, 721, 785, 911

[56] References Cited

U.S. PATENT DOCUMENTS

| | | | |
|---|---|---|---|
| 2,254,292 | 9/1941 | Jones | 414/703 X |
| 2,593,796 | 4/1952 | Riewerts | 414/703 X |
| 2,671,570 | 3/1954 | Richey | 414/704 X |
| 2,798,627 | 7/1957 | Kucera | 414/722 |
| 3,079,021 | 2/1963 | Kohorst et al. | 414/725 |
| 3,272,287 | 9/1966 | Easton | 414/785 X |
| 3,967,742 | 7/1976 | Meinert | 414/24.5 |
| 3,985,246 | 10/1976 | Seymour | 414/497 X |

Primary Examiner—Leslie J. Paperner
Attorney, Agent, or Firm—Rudolph L. Lowell

[57] ABSTRACT

The bale handling attachment is adapted to be pivotally mounted on the pivoted vertically movable lift arms of a usual tractor three-point hitch and includes a pair of tine members that have limited downward pivotal movement, relative to the lift arms, to positions extended longitudinally of the lift arms. When the lift arms are lowered, the tine members are pivotally movable upwardly, relative to the lift arms, to horizontal ground engaged positions for following the ground contour to locations at opposite sides of the bottom portion of a bale to be handled. An upright push plate has the bottom edge thereof rideable on the upper surfaces of the tine members, and is movable from a rest position at the inner ends of the tine members, to a bale unloading position adjacent the outer ends thereof to provide for bales being stored in a double tier, one on top of the other.

2 Claims, 7 Drawing Figures

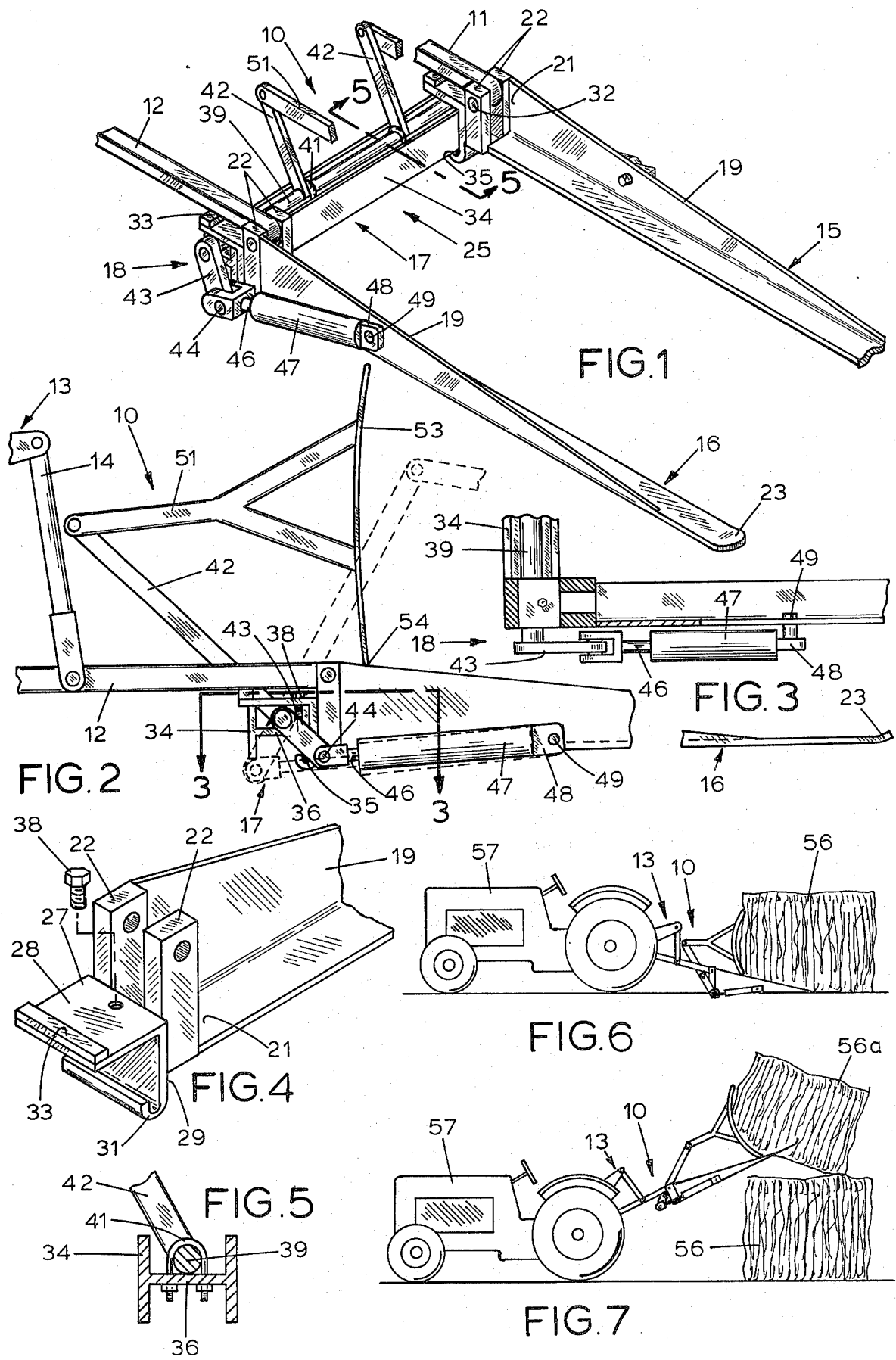

ROUND BALE HANDLING ATTACHMENT FOR A TRACTOR

BACKGROUND OF THE INVENTION

The mounting of a round bale handling attachment on the three point hitch of a tractor has become a common practice. These attachments, although generally satisfactory for the purpose of picking up and transporting a bale, have limited capacity for arranging the bale for storage. Also, inconvenience is encountered in the releasing of a bale since this operation is limited to moving the tractor away from the bale when the bale is ground supported.

Thus, in U.S. Pat. No. 3,934,726, a round bale is impaled on a pair of tine members and then is maintained on the tine members by a power actuated holding arm. When the bale is to be released, it is initially supported on the ground after which the holding arm is rendered ineffective and the tractor advanced to pull the tines from the bale.

The attachment shown in U.S. Pat. No. 3,957,167 has the bale supported on tine members which are movable to lowered horizontally extended positions for loading the bale. The bale is released by reversing the loading operation or by tilting the tine members downwardly when the tractor lift arms are in their elevated positions. This tilting action provides for the bale being dropped directly to the ground.

U.S. Pat. No. 3,921,837 shows a bale carrier attachment for the bucket of a tractor mounted front end loader. A bale is impaled on tine members that project forwardly from the bucket after which the tines are elevated and tilted upwardly and forwardly to hold the bale for transport. This attachment provides for the bales being stored in tiers but release of a bale from the attachment is only made by reversing the tractor to pull the tines from the bale.

SUMMARY OF THE INVENTION

The round bale handling attachment is of a simple and compact construction and comprised of relatively few parts that can be easily and quickly assembled and mounted by one man on the pivoted vertically movable lift arms of a tractor three point hitch. A pair of tine members corresponding to a pair of lift arms each has an associated bracket unit pivotally connected to a lift arm. An abutment member on the bracket unit is engageable with the underside of an associated lift arm to limit downward pivotal movement of a tine member to a position in substantial longitudinal alignment with the associated lift arm. Upward pivotal movement of the tine members permits their movement in a following relation with the ground surface when the lift arms are in lowered positions. The bale unloading member is an upright pushplate that is movable longitudinally of the tine members in riding engagement on the top sides thereof by a power actuated means detachably secured to the bracket units. The push plate is movable from a rest position adjacent the lift arms to a bale unloading position adjacent the free ends of the tine members. Since a bale has the lower side portion thereof resting directly on the top sides of the tine members, the bale is readily removed from the tine members by the push plate at any elevated position of the tractor lift arms without requiring any tractor movement.

BRIEF DESCRIPTION OF THE DRAWINGS

FIG. 1 is a perspective view showing the assembly relation of the bale handling attachment of this invention with the lift arms of a tractor mounted three point hitch, with parts broken away to more clearly show such assembly;

FIG. 2 is an enlarged foreshortened side elevational view of the assembly in FIG. 1;

FIG. 3 is a detail sectional view on line 3—3 in FIG. 2;

FIG. 4 is an enlarged detail perspective view showing the assembly of the rear end of a tine member with an associated mounting bracket unit;

FIG. 5 is an enlarged sectional view as seen on line 5—5 in FIG. 1;

FIG. 6 is a diagrammatic illustration showing the bale handling attachment and tractor lift arms in their relative positions providing for the loading of a bale; and FIG. 7 is a diagrammatic illustration showing the relative positons of the tractor lift arms and the bale handling attachment in the release of a bale to a storage position on a ground supported bale.

DETAILED DESCRIPTION OF THE INVENTION

The round bale handling attachment of this invention, indicated generally as 10, is shown in FIGS. 1 and 2 in assembly relation with a pair of lift arms 11 and 12 which form part of a tractor three-point hitch, indicated generally at 13. As is well known, the lift arms 11 and 12 may project outwardly from one end of a usual farm tractor and are pivotally movable up and down in vertical planes in response to actuation of a hydraulic lift mechanism 14 (FIG. 2) that is operated from the tractor hydraulic power system.

The bale handling attachment 10 (FIG. 1) has a frame structure 25 of a generally U-shape in plan view and includes a pair of leg sections or tine assemblies 15 and 16, a base section or assembly 17 and a bale unloading assembly 18. Since each tine assembly 15 and 16 is of a like construction and similar in operation, only the assembly 15 will be described in detail with like numbers being applied to the assembly 16.

The tine assembly 15 is comprised of an elongated tine member 16 of an angle iron construction having what will be referred to as its inner end 21, rigidly secured as by welding to a pair of upright transversely spaced connecting members 22. As shown in FIGS. 1 and 4, securement is made with the horizontal leg of the tine member 19 extended inwardly of the frame structure 14 and its vertical leg extended upwardly. The upper edge of the upright leg of the tine member 19 is progressively tapered downwardly from the connector members to terminate with the horizontal leg thereof in a generally curved upturned arrow shaped outer end 23.

Secured to the upright connectors 22 (FIG. 4) adjacent their lower ends and on the sides thereof opposite the tine member 19, is a mounting bracket 27 for the base assembly 17. The bracket 27 is of a generally right angle shape having a horizontal section 28 and a vertical section 29 projected downwardly from the members 22 and terminating in a hook portion 31. The connectors 22 are spaced a distance apart to receive therebetween the free ends of the lift arm 11 in a pivoted connection 32 for pivotal up and down movement of the tine assembly 15 relative to the lift arm 11. For a purpose to appear later, the upper surface of the horizontal section 28 of the bracket 27 carries a stop member 33 that is engageable with the underside of the lift arm 11 to limit downward pivotal movement of the tine assembly 15 to a position extended longitudinally of the lift arm 11 but permitting free upward pivotal movement of the tine assembly.

The base assembly 17 (FIGS. 1 and 2) consists primarily of a beam member 34 of an I-shape in transverse cross section with the connecting web 36 of the I-beam 34 arranged horizontally. The beam member 34 is assembled with the mounting bracket 27 by inserting the lower side portion of the cross arm 35 thereof within the hook portion 31 and then pivoting the beam member into a nested fit within the mounting bracket with the cross arm 35 flat against the vertical section 29 of the mounting bracket 27. The I-beam 34 is maintained in this assembly relation with the bracket 27 by a cap screw 38 threadable through the horizontal section 28 of the bracket 27 for projection at a position adjacent the upper portion of the vertical cross arm 35.

The bale unloading assembly 18 (FIGS. 1 and 3) comprises a rock shaft 39 arranged within the upper portion of the I-beam 34 and extended longitudinally thereof so that its opposite ends extend outwardly from the mounting brackets 27. The shaft 39 (FIGS. 1 and 5) is supported for rockable movement on the web 36 of the beam 34 by a pair of U-clamps 41 extended about the shaft with their legs projected downwardly through the web 36. A pair of upright rock arms 42 are arranged relative to and in contact engagement with the clamps or bearing units 41 to maintain the shaft against movement longitudinally of the I-beam 34.

Each projected end of the rock shaft 39 (FIG. 3) carries a rock arm 43 which, as shown in FIG. 2, is in substantially diametrical alignment with the rock arm 42 relative to the shaft 39. Each rock arm 43 is pivotally connected at 44 to the rod 46 of an associated double acting hydraulic cylinder assembly 47. Each cylinder assembly 47 is arranged along side of a tine member 19 with the end 48 thereof pivotally connected at 49 to the upright leg section of a tine member 19.

The free end of each rock arm 42 (FIG. 2) is pivotally connected to one end of a lever 51, the opposite end of which is bifurcated and secured to the rear side of an upright push plate or bale unloading member 53 extended between tine assemblies 15 and 16 with its lower side 54 supported on the upper edge of the vertical leg section of the tine members 19. The push plate is movable in an upright position longitudinally of the tine assemblies with its lower side 54 in riding engagement on the top sides of the tine members 19.

In the use of bale handling attachment 10, when a ground supported bale indicated at 56 in FIG. 6, is to be carried on the tine members 19, the lift arms 11 and 12 of the three point hitch 13, shown as being carried at the rear end of a usual farm tractor 57, are vertically moved to their lowered position. By virtue of the tine assemblies 15 and 16 being pivotally movable upwardly relative to the lift arms 11 and 12, the tine members 19 are horizontally positionable on the ground surface. With a bale 56 lined up with the tractor 57 so as to be received between the tine assemblies 15 and 16, the tractor is driven in a reversed direction to locate the tine assemblies at opposite sides of the bottom portion of the bale 56. Because of the free upward pivotal movement of the tine assemblies relative to their associated lift arms, and the upturned ends 23 of the tine members 19, the tine assemblies are permitted to travel in a following relation with the contour of the ground surface into a lifting position relative to the bale 56 without any digging into the ground surface during such travel. It will be noted that when the bale 56 is to be loaded, the push plate 53 is in a rest position adjacent the connector members 22 so that substantially the full lengths of the tine members 19 are free to receive the bale thereon.

With the lower portion of the bale 56 positioned between the tine assemblies 15 and 16, the lift arms 11 and 12 are elevated, with such elevating movement taking place relative to the tine assemblies 15 and 16 until abutting engagement is made by the stop members 33 with the undersides of the lift arms. When this engagement takes place, the lift arms 11 and 12 and the attachment 10 are movable as a unit, as illustrated in FIG. 7, whereby the bale 56 may be elevated to a position for either transport or unloading.

In the unloading of a bale 56 to a ground supported storage position, the bale loading procedure above described may be reversed. With the bale 56 on the ground, as shown in FIG. 6, it is only necessary to advance the tractor without requiring any actuation of the push plate 53. However, in some instances, this unloading operation may be more easily accomplished by moving the push plate 53 to push the bale 56 from the tine assemblies 15 and 16 concurrently with the advance of the tractor from the bale.

When bales are to be stored in a double tiered arrangement, as shown for the bales 56 and 56a in FIG. 7, the bale 56a would be initially loaded in all respects the same as described for bale 56 in connection with FIG. 6. However, to store the bale 56a on top of the bale 56, the lift arms 11 and 12, when the tractor 57 is adjacent to one end of the bale 56, are pivotally moved to an elevated position for projection over the bale 56. In such elevated position, the push plate 53 is actuated to push the bale 56a from the tine members 19 for dropping onto the bale 56. If required, the tractor may be advanced concurrently with the actuation of the push plate to release the bale 56a.

Although the invention has been described with respect to a preferred embodiment thereof, it is to be understood that it is not to be so limited since changes and modifications can be made therein which are within the full intended scope of this invention as defined by the appended claims.

I claim:

1. A round bale handling attachment for a tractor having a pair of transversely spaced vertically movable pivoted lift arms projected longitudinally of and outwardly from one end of the tractor, comprising:
   (a) a frame structure mountable on the free ends of said lift arms including a pair of transversely spaced tine members extending longitudinally outwardly from the lift arms,
   (b) a bale unloading member movably supported on said frame structure for movement longitudinally of said tine members in riding engagement on the upper surfaces thereof,
   (c) power means on said frame structure for moving the bale unloading member from a first bale loading position to a second bale unloading position,
   (d) means for pivotally connecting a tine member with the free end of a lift arm for up and down pivotal movement relative thereto, said frame structure including a transverse frame member extended between and connectable to the tine members adjacent the pivoted ends thereof, (e) means for limiting the downward pivotal movement of said tine members to positions extended longitudinally of said lift arms, including a bracket unit at the pivoted end of each tine member having a stop member located below and engageable with the bottom side of an adjacent lift arm to define said longitudinally extended positions, (f) said tine members, when lowered by said lift arms to positions resting on a ground surface, being pushed upwardly relative to said lift arms for movement along the ground in a following relation therewith, and, when elevated by said lift arms out of ground engagement, are pivotally movable as a unit with the lift arms in said longitudinally extended positions therefor, and (g) coacting means on said bracket unit and frame member for releasably securing said frame member with said tine members at a position below said lift arm stop members.

2. The round bale handling attachment according to claim 1, wherein:

(a) said rock shaft is rockably supported on and extends longitudinally of said frame member.

* * * * *